Patented Jan. 8, 1952

2,582,049

UNITED STATES PATENT OFFICE 2,582,049

MANUFACTURE OF CELLULOSE TRIACETATE

Carl J. Malm and Carlton L. Crane, Rochester, N. Y., assignors to Eastman Kodak Company, Rochester, N. Y., a corporation of New Jersey No Drawing. Application June 3, 1950, Serial No. 166,058

9 Claims. (Cl. 260—227)

This relates to the preparation of a stable substantially fully esterified cellulose triacetate using sulfuric acid as a catalyst. This can be done by removing substantially all of the combined sulfur from the cellulose acetate and replacing it with acetyl groups.

Substantially fully acetylated cellulose has been known for decades, having been the first organic acid ester of cellulose to which attention was given. However due to the fact that when it was originated, its stability was poor and its solubility properties were not those desired, methods were worked out to reduce the acetyl content so as to increase the stability and also supply the solubility properties desired. Previous methods for making substantially fully acetylated cellulose have either resulted in unstable triacetates, the esterification has been carried out by a catalyst other than sulfuric acid, or if sulfuric acid were used, a small amount of hydrolysis was given to the cellulose ester so that the resulting product was something less than a substantially fully esterified product. The fully esterified cellulose acetate is of interest because of its unusually high moisture resistance and dielectric properties.

One object of our invention is to prepare a cellulose acetate which is stable, of good viscosity properties, and having an acetyl content of at least 44.3 per cent. Another object of our invention is to prepare a stable high acetyl cellulose acetate in which sulfuric acid is used as the catalyst in the esterification of the cellulose. Other objects of our invention will appear herein.

We have found that a stable high acetyl cellulose ester can be prepared even though sulfuric acid has been employed as the catalyst in the cellulose esterification. At the termination of the esterification of the cellulose, the following steps are carried out:

1. Neutralize 60–90 per cent of the sulfuric acid with a magnesium or calcium neutralizing agent.

2. Increase the temperature to at least 110° F. and while maintaining the temperature above that point, adding water as such or in diluted form in an amount which will substantially completely destroy the acetic anhydride present therein.

3. Completely neutralize the sulfuric acid which remains, with a magnesium or calcium neutralizing agent.

4. Then add acetic anhydride to the mass and heating it to at least 160° F. for a time sufficient to bring the acetyl up to the point desired.

It is within the contemplation of our invention to use any neutralizing agent which does not form acetic acid soluble sulfates, which will ordinarily be any of the compounds of the bivalent metals which are sufficiently basic to neutralize sulfuric acid in acetic acid solution. Although magnesium neutralizing agents are the most useful for this purpose, some compounds of this type being magnesia, magnesium carbonate, magnesium acetate or the like, compounds of calcium, zinc, barium, etc., may, if desired, be employed for this purpose. In the initial neutralizing step not more than 90 per cent of the sulfuric acid should be neutralized as apparently the presence of some sulfuric acid is desirable to promote the removal of sulfur from the cellulose ester upon bringing the mass to the glacial point. The amount of water added should only be an amount which will just bring the mass to the glacial point as any great excess of water may result in a product having haze or grain. The amount of excess water should be limited to not more than 2 per cent to avoid graininess in the resulting product. If however dilute acetic acid is used as the addition agent, the amount of excess water may be as much as 5 per cent without experiencing any appreciable graining effect therefrom.

The amount of water necessary to destroy the acetic anhydride can be calculated, the anhydride present being determined by subtracting the amount of anhydride which was used up in esterifying the cellulose and that which reacted with the water in the cellulose and the reagents initially used from the amount of anhydride which was employed in the esterification mixture. The glacial point as defined herein is that point in the esterification bath where neither water nor anhydride is present and it is this point that should be approximated in the second step of treatment in accordance with our invention. The glacial point of the mass can be determined qualitatively by the color change of crystal violet indicator made up in glacial acetic acid. This solution acts as a color indicator, the colors obtained being as follows:

1. If the bath contains acetic anhydride and the catalyst is not completely neutralized, the color is yellow.

2. If the bath is at the glacial point, the color is green.

3. If an excess of water is present, the indicator is blue or violet in color.

The water or weak acid is carefully added to the esterification mass so as to destroy the anhydride without precipitating any of the cellulose ester or without dropping the temperature of the mass below that of at least 110° F. If desired, the operator can combine steps 1 and 2 by incorporating the neutralizing agent in the water, or weak acid added to destroy the anhydride while keeping the temperature elevated. In actual practice it is preferable to maintain the outside of the vessel at 160-170° F. and the mass on the inside is maintained at above 150° F., thereby any temperature within the range 110-200° F. being quite satisfactory.

After the anhydride has been destroyed by the addition of water or dilute acetic acid to the mass, the balance of the catalyst is neutralized by adding further neutralizing agent of the type specified herein, while maintaining an elevated temperature. The amount of neutralizing agent is added such as up to a 10 per cent excess of the amount necessary for complete neutralization.

In the next step acetic anhydride is added to the mass which can be in an amount of 1½ to 50 per cent based on the liquid in the bath, although the proportions found most practical are within the range of 1½ to 10 per cent. This addition is for the purpose of esterifying the available hydroxyls formed by the removal of the combined sulfur and to provide a solvent system for the cellulose ester obtained. In this step the mass is heated at a temperature of at least 160° F. such as within the range of 160-170° F. for a minimum of six hours. If this step is carried out in an autoclave, a high temperature such as 200-250° F. may be employed. Any temperature between 160 and 250° F. is suitable for the purpose of this step. Ordinarily a time of twelve hours is sufficient to accomplish any further esterification desired, and therefore a time within the range of six to twelve hours will ordinarily be used here, although longer times such as up to 24 hours can be employed.

After the cellulose acetate has been given the treatment described, it contains an acetyl content of at least 44.3 per cent and has a good degree of stability as shown by its resistance to charring upon subjecting to heat tests. The cellulose acetate may be recovered by diluting the mass with acetic acid so as to render it readily flowable, such as a viscosity of the mass of not more than 10 cps., and then precipitating by flowing the mass into boiling water. However the cellulose acetate may be precipitated in any manner desired. For instance, instead of using boiling water, the precipitation can be accomplished by flowing the mass into dilute aqueous acetic acid. After precipitation the cellulose acetate obtained is separated from the liquid mass, washed, preferably with mineral-free water until thoroughly free of acid and dried. The resulting product has a sulfur content of less than 0.1 per cent and as a rule on the order of 0.01 per cent and a good stability as shown by heating the dry ester for eight hours at 180° C. in which tests little or no discoloration occurs. The following examples illustrate my invention.

*Example I*

Three hundred parts of acetylation grade cotton linters containing 5.8 parts of water were placed in an acetylation apparatus and mixed with 1200 parts of acetic acid containing 2.2 parts of water. The mass was stirred for thirty minutes while carrying a jacket temperature of 110° F. Thereupon a mixture consisting of 3⅛ parts of 93.7 per cent sulfuric acid and 50 parts of acetic acid were added and the reaction was cooled to 66° F. Eight hundred forty parts of 97 per cent acetic anhydride were added and the reaction mass was cooled to 50° F. Thereupon a mixture of 18.3 parts of 93.7 per cent sulfuric acid and 670 parts of acetic acid were added. The esterification temperature was allowed to rise to 70° over a period of 30 minutes and finally to a maximum temperature of 88° F. to obtain a good fiber-free solution.

When the esterification was complete (1½ hours) the jacket temperature was raised to 170° F. and 13.5 parts of magnesium carbonate were added to the esterification bath. 35.1 parts of water were then added to the bath over a period of thirty minutes while maintaining the elevated temperature. When the water addition was complete, 8.1 parts of magnesium carbonate were added and the bath was stirred for five minutes at approximately 150° F. Thereupon a mixture of 1652 parts of 97 per cent acetic anhydride and 3789 parts of acetic acid were added to the bath. The bath was heated to 160° F. and that temperature was maintained while the solution was stirred for six hours. One-half of the solution was removed and precipitated without further dilution into boiling distilled water. The precipitate was washed in twelve 2-hour changes in mineral-free water. The product, designated A, was centrifuged and dried at 140° F.-150° F.

The heating and agitating was continued on the balance of the solution for a further six hours at 160° F. and was then precipitated in mineral-free water. The product, designated B, was washed and dried in the same manner as the other sample. The products gave the following analyses:

|  | A | B |
| --- | --- | --- |
| Acetyl content_____per cent__ | 44.6 | 44.7 |
| Viscosity at 25° C. in 10% solution of nine parts of methylene chloride and one part of methyl alcohol_____cps._ | 3,680 | 3,530 |
| Total sulfur_____per cent__ | 0.049 | 0.040 |

*Example II*

Three hundred parts of acetylation grade linters containing nine parts of moisture were placed in an acetylator together with 1200 parts of acetic acid and presoaked for thirty minutes while maintaining the jacket at 110° F. A mixture of 3⅛ parts of 95 per cent sulfuric acid and 50 parts of acetic acid were then added and the reaction mass was cooled to 66° F. Eight hundred forty parts of 97 per cent acetic anhydride were added to the acetylator and the mass was cooled to 50° F. A mixture consisting of 19 parts of 95 per cent sulfuric acid and 610 parts of acetic acid were added and the temperature was allowed to rise to a maximum temperature of 87° F. When the reaction was complete (1¾ hours) the jacket temperature was raised to 175° F. and a mixture consisting of 33.7 parts of water, 266.3 parts of acetic acid and 13.6 parts of magnesium carbonate were added and the mixture was stirred for fifteen minutes. 13.5 parts of magnesium carbonate were added and the mass was stirred for 15 minutes at 170° F. 622 parts of 97 per cent acetic anhydride were then added to the bath and the mixture was stirred for fifteen minutes and then transferred to a tumbler type autoclave. The mass was tumbled for six hours while heating at 200° F.

Sixteen hundred parts of the reaction mass was removed from the autoclave and diluted with 3630 parts of acetic acid. The diluted solution was then precipitated by running into boiling water. The precipitate was washed in twelve 2-hour changes in mineral-free water, centrifuged and dried at 140° F.

The rest of the solution in the autoclave was heated and tumbled for a total of twelve hours at 200° F. The mass was diluted with 6800 parts of glacial acetic acid and precipitated and purified in the same manner described in the preceding paragraph. These samples were designated C and D, respectively, and the following analyses were obtained:

|  | C | D |
|---|---|---|
| Acetyl content_____per cent__ | 44.3 | 44.5 |
| Intrinsic viscosity in formic acid_____ | 2.93 | 2.54 |
| Viscosity at 25° C. in 10% solution in nine parts methylene chloride and one part methyl alcohol.cps.. | 7,273 | 3,667 |
| Total sulfur_____per cent__ | 0.020 | 0.011 |
| Dry heat test 8 hours at 180° C_____ | 24 | 13 |

Example III

Three hundred parts of acetylation grade linters containing 12 parts moisture were placed in an acetylator with 1200 parts of acetic acid. The linters were presoaked for thirty minutes with a jacket temperature of 110° F. A mixture consisting of 3⅓ parts of 95 per cent sulfuric acid and 50 parts of acetic acid were added to the mixture and the reaction bath was cooled to 66° F. Eight hundred forty parts of 97 per cent acetic anhydride were added to the reaction bath and the mass was cooled to 50° F. A mixture consisting of nineteen parts of 95 per cent sulfuric acid and 670 parts of acetic acid were added to the mass and the temperature allowed to rise in thirty minutes to 80° F. and then kept at a maximum reaction temperature of 90° F.

When the reaction was complete (2 hours and 24 minutes) the jacket temperature was raised to 150° F. and a mixture consisting of 86 parts of water, 775 parts of acetic acid and 13.6 parts of magnesium carbonate were added to the esterification bath over thirty minutes. The jacket temperature was raised to 170° F. and the mixture stirred for twenty minutes. 13.5 parts of magnesium carbonate were added to the solution and mixing was continued for fifteen minutes at 170° F. 392 parts of 97 per cent acetic anhydride were added to the bath over an interval of ten minutes and stirred for thirty minutes. The solution was transferred to a jacketed tumbler type autoclave and the temperature was raised to 250° F. The mass was heated and tumbled for twelve hours at 25° F. diluted with 6810 parts of glacial acetic acid and precipitated in boiling mineral-free water. The precipitate was washed in fifteen 2-hour changes of mineral-free water, centrifuged and dried at 140° F. Upon analysis the following values were obtained:

Acetyl _____per cent__ 44.6
Viscosity at 25° in 10% solution in nine
 parts methylene chloride and one part
 methyl alcohol _____cps__ 3864
Sulfur _____per cent__ 0.010
Dry heat test 8 hours at 180° C. _____ 10

What we claim and desire to secure by Letters Patent of the U. S. is:

1. A method for preparing a stable cellulose acetate having an acetyl content of at least 44.3 percent which comprises acetylating cellulose with a mixture comprising acetic anhydride and sulfuric acid catalyst, neutralizing 60–90 per cent of the sulfuric acid in the mass with a neutralizing agent which forms sulfates insoluble in acetic acid, adding water to bring the mass to and not substantially beyond the glacial point while the mass is maintained at a temperature of at least 110° F., completely neutralizing the free sulfuric acid present while maintaining the elevated temperature by adding a neutralizing agent which forms sulfates insoluble in acetic acid, not more than 10 per cent excess of the neutralizing agent being employed, adding 1½–50 per cent (based on the liquid in the bath) of acetic anhydride and maintaining at 160–250° F. for a time within the range of 6–24 hours, sufficient to impart the desired acetyl, followed by separating the high acetyl cellulose acetate from the mass.

2. A method for preparing a stable cellulose acetate having an acetyl content of at least 44.3 percent which comprises acetylating cellulose with a mixture comprising acetic anhydride and sulfuric acid catalyst, adding a mixture of a neutralizing agent which forms sulfates insoluble in acetic acid in an amount sufficient to neutralize 60–90 per cent of the sulfuric acid in the mass and that amount of water which will bring the mass to and not substantially beyond the glacial point while the mass is maintained at a temperature of at least 110° F., completely neutralizing the free sulfuric acid present, while maintaining the elevated temperature, by adding a neutralizing agent which forms sulfates insoluble in acetic acid, not more than 10 per cent excess of the neutralizing agent being employed, adding 1½–50 per cent (based on the liquid in the bath) of acetic anhydride and maintaining at 160–250° F. for a time within the range of 6–24 hours sufficient to impart the desired acetyl, followed by separating the high acetyl cellulose acetate from the mass.

3. A method for preparing a stable cellulose acetate having an acetyl content of at least 44.3 percent which comprise acetylating cellulose with a mixture comprising acetic anhydride and sulfuric acid catalyst, adding a mixture of a neutralizing agent which forms sulfates insoluble in acetic acid, in an amount sufficient to neutralize 60–90 per cent of the sulfuric acid in the mass and that amount of water which will bring the mass to and not substantially beyond the glacial point while the mass is maintained at a temperature of at least 110° F., completely neutralizing the free sulfuric acid present, while maintaining the elevated temperature, by adding a neutralizing agent which forms sulfates insoluble in acetic acid, not more than 10 per cent excess of the neutralizing agent being employed, adding 1½–10 per cent (based on the liquid in the bath) of acetic anhydride and maintaining at 160–250° F. for a time within the range of 6–24 hours sufficient to impart the desired acetyl, followed by separating the high acetyl cellulose acetate from the mass.

4. A method for preparing a stable cellulose acetate having an acetyl content of at least 44.3 percent which comprises acetylating cellulose with a mixture comprising acetic anhydride and sulfuric acid catalyst, adding a mixture of a neutralizing agent which forms sulfates insoluble in acetic acid in an amount sufficient to neutralize 60–90 per cent of the sulfuric acid in the mass and that amount of water which will bring the mass to and not substantially beyond the glacial point while the mass is maintained at a temperature of at least 110° F., completely neutralizing the free sulfuric acid present, while maintaining the elevated temperature, by adding a neutralizing agent which forms sulfates insoluble in acetic acid, not more than 10 per cent excess of the neutralizing agent being employed, adding 1½–50 per cent (based on the liquid in the bath) of acetic anhydride and maintaining at 160–170° F. for a time within the range of 6–24 hours sufficient to impart the desired acetyl, followed by separating the high acetyl cellulose acetate from the mass.

5. A method for preparing a stable cellulose acetate having an acetyl content of at least 44.3 percent which comprises acetylating cellulose with a mixture comprising acetic anhydride and sulfuric acid catalyst, adding a mixture of a neutralizing agent which forms sulfates insoluble in acetic acid in an amount sufficient to neutralize 60–90 per cent of the sulfuric acid in the mass and that amount of water which will bring the mass to and not substantially beyond the glacial point while the mass is maintained at a temperature of at least 110° F., completely neutralizing the free sulfuric acid present, while maintaining the elevated temperature, by adding a neutralizing agent which forms sulfates insoluble in acetic acid, not more than 10 per cent excess of the neutralizing agent being employed, adding 1½–50 per cent (based on the liquid in the bath) of acetic anhydride and maintaining at 200–250° F. for a time within the range of 6–24 hours sufficient to impart the desired acetyl, followed by separating the high acetyl cellulose acetate from the mass.

6. A method for preparing a stable cellulose acetate having an acetyl content of at least 44.3 percent which comprises acetylating cellulose with a mixture comprising acetic anhydride and sulfuric acid catalyst, neutralizing 60–90 per cent of the sulfuric acid in the mass with a neutralizing agent which forms sulfates insoluble in acetic acid, adding water to bring the mass to and not substantially beyond the glacial point while the mass is maintained at a temperature of at least 110° F., completely neutralizing the free sulfuric acid present while maintaining the elevated temperature by adding a neutralizing agent which forms sulfates insoluble in acetic acid, not more than 10 per cent excess of the neutralizing agent being employed, adding 1½–50 per cent (based on the liquid in the bath) of acetic anhydride and maintaining at 160–250° F. for a time of 6–12 hours sufficient to impart the desired acetyl, followed by separating the high acetyl cellulose acetate from the mass.

7. A method for preparing a stable cellulose acetate having an acetyl content of at least 44.3 percent which comprises acetylating cellulose with a mixture comprising acetic anhydride and sulfuric acid catalyst, neutralizing 60–90 per cent of the sulfuric acid in the mass with a neutralizing agent which forms sulfates insoluble in acetic acid, adding water to bring the mass to and not substantially beyond the glacial point while the mass is maintained at a temperature of at least 110° F., completely neutralizing the free sulfuric acid present while maintaining the elevated temperature by adding a neutralizing agent which forms sulfates insoluble in acetic acid, not more than 10 per cent excess of the neutralizing agent being employed, adding 1½–50 per cent (based on the liquid in the bath) of acetic anhydride and maintaining at 160–170° F. for a time within the range of 6–12 hours sufficient to impart the desired acetyl, followed by separating the high acetyl cellulose acetate from the mass.

8. A method for preparing a stable cellulose acetate having an acetyl content of at least 44.3 percent which comprises acetylating cellulose with a mixture comprising acetic anhydride and sulfuric acid catalyst, then adding to the completed reaction mass a mixture of water, acetic acid and a basic magnesium compound, the water being in an amount to bring the mass to and not substantially beyond the glacial point, and the magnesium compound being in an amount which will neutralize 60–90 per cent of the sulfuric acid in the mass, while the mass is maintained at a temperature of at least 110° F., completely neutralizing the free sulfuric acid present with basic magnesium compound while maintaining the elevated temperature not more than 10 per cent of the magnesium compound being employed, adding 1½–50 per cent (based on the liquid in the bath) of acetic anhydride and maintaining at 160–210° F. for a time within the range of 6–12 hours sufficient to impart the desired acetyl, followed by separating the high acetyl cellulose acetate from the mass.

9. A method for preparing a stable cellulose acetate having an acetyl content of at least 44.3 percent which comprises acetylating cellulose with a mixture comprising acetic anhydride and sulfuric acid catalyst, neutralizing 60–90 per cent of the sulfuric acid in the mass with a basic magnesium compound, adding water to bring the mass to and not substantially beyond the glacial point while the mass is maintained at a temperature of at least 110° F., completely neutralizing the free sulfuric acid present while maintaining the elevated temperature by adding a basic magnesium compound thereto, not more than 10 per cent excess of the magnesium compound being employed, adding 1½–10 per cent (based on the liquid in the bath) of acetic anhydride and maintaining at 160–250° F. for a time within the range of 6–12 hours sufficient to impart the desired acetyl, followed by separating the high acetyl cellulose acetate from the mass.

CARL J. MALM.
CARLTON L. CRANE.

REFERENCES CITED

The following references are of record in the file of this patent:

UNITED STATES PATENTS

| Number | Name | Date |
|---|---|---|
| 2,082,238 | Barthelemy et al. | June 1, 1937 |
| 2,128,340 | Werner | Aug. 30, 1938 |
| 2,259,462 | Fischer | Oct. 21, 1941 |
| 2,475,678 | Rowley | July 12, 1949 |